United States Patent
Chung et al.

(10) Patent No.: US 9,179,120 B2
(45) Date of Patent: Nov. 3, 2015

(54) METHOD FOR DISPLAYING STEREOSCOPIC IMAGES AND IMAGE DISPLAY APPARATUS THEREOF

(75) Inventors: Wooseong Chung, Seoul (KR); Kyutae Ahn, Seoul (KR); Juhwan Lee, Seoul (KR); Chongsok Kim, Seoul (KR); Jaehoon Shin, Seoul (KR); Dohyung Kim, Seoul (KR); Hongjae Maeng, Seoul (KR)

(73) Assignee: LG Electronics Inc., Seoul (KR)

( * ) Notice: Subject to any disclaimer, the term of this patent is extended or adjusted under 35 U.S.C. 154(b) by 432 days.

(21) Appl. No.: 13/356,819

(22) Filed: Jan. 24, 2012

(65) Prior Publication Data

US 2013/0076746 A1 Mar. 28, 2013

(30) Foreign Application Priority Data

Sep. 22, 2011 (KR) ........................ 10-2011-0095961

(51) Int. Cl.
*G06T 15/40* (2011.01)
*H04N 13/00* (2006.01)

(52) U.S. Cl.
CPC ................................ *H04N 13/0022* (2013.01)

(58) Field of Classification Search
USPC ............. 345/419, 422; 382/154, 265; 348/42; 359/462
See application file for complete search history.

(56) References Cited

U.S. PATENT DOCUMENTS

| | | | | |
|---|---|---|---|---|
| 8,508,580 B2* | 8/2013 | McNamer et al. | ............... | 348/43 |
| 8,705,935 B2* | 4/2014 | Ikeda et al. | ................... | 386/244 |
| 2007/0097113 A1 | 5/2007 | Lee et al. | ...................... | 345/419 |
| 2011/0050687 A1* | 3/2011 | Alyshev et al. | ............... | 345/419 |
| 2011/0103680 A1* | 5/2011 | Mashitani et al. | ............ | 382/154 |
| 2011/0126159 A1 | 5/2011 | Ko et al. | ....................... | 715/848 |
| 2011/0157155 A1* | 6/2011 | Turner et al. | .................. | 345/419 |

FOREIGN PATENT DOCUMENTS

| | | |
|---|---|---|
| CN | 1952883 A | 4/2007 |
| EP | 2 346 263 A1 | 7/2011 |
| KR | 10-2008-0022309 A | 3/2008 |
| KR | 10-2011-0037472 A | 4/2011 |
| KR | 10-2011-0056775 A | 5/2011 |
| KR | 10-2011-0057921 A | 6/2011 |
| WO | WO 2009/020277 | 2/2009 |

(Continued)

OTHER PUBLICATIONS

Korean Office Action dated Feb. 27, 2013 issued in Application No. 10-2011-0095961.

(Continued)

*Primary Examiner* — Kimbinh T Nguyen
(74) *Attorney, Agent, or Firm* — Ked & Associates, LLP (57) ABSTRACT

The present disclosure relates to a method for displaying stereoscopic images and image display apparatus thereof, the displaying method includes producing a depth map using left eye images and right eye images; adjusting depth values of the produced depth map according to any one of a plurality of depth level adjustment modes; and displaying the stereoscopic images using the adjusted depth values, wherein the depth level adjustment modes include a forward 3D depth adjustment mode increasing the depth levels representing perspective of objects included in the stereoscopic images, a backward 3D depth adjustment mode reducing the depth levels and a bi-directional 3D depth adjustment mode simultaneously increasing and reducing the depth levels.

17 Claims, 11 Drawing Sheets

(56) References Cited

FOREIGN PATENT DOCUMENTS

| WO | WO 2011/059270 A2 | 5/2011 |
| WO | WO 2011/081623 | 7/2011 |

OTHER PUBLICATIONS

Korean Office Action dated Aug. 20, 2012 issued in Application No. 10-2011-0095961.

Korean Notice of Allowance dated Jun. 26, 2013 issued in Application No. 10-2011-0095961.

Chinese Office Action dated May 26, 2014 issued in Application No. 201210038952.3.

European Search Report issued in related Application No. 12000574.9 dated Sep. 5, 2014.

* cited by examiner

METHOD FOR DISPLAYING STEREOSCOPIC IMAGES AND IMAGE DISPLAY APPARATUS THEREOF

CROSS-REFERENCE TO RELATED PATENT APPLICATIONS

This application claims priority to Korean Patent Application No. 10-2011-0095961, filed September 22, 2011.

BACKGROUND OF THE INVENTION

1. Technical Field

The present disclosure relates to a method for displaying stereoscopic images in an image display apparatus.

2. Description of the Related Art

The image display apparatus is an apparatus displaying images to enable a user to view. The user may view broadcasting through the image display apparatus. The image display apparatus displays broadcasting selected by the user among broadcasting signals transmitted from broadcasting stations on the display. Currently broadcasting has increasingly converted from analog broadcasting to digital broadcasting all over the world.

The digital broadcasting means the broadcasting transmitting the digital images and voice signals. The digital broadcasting is more robust to external noises than analog broadcasting, such that the data loss is reduced, the error correction is advantageous, the resolution is high, and the definite screen is provided. Further, the digital broadcasting is available for interactive services unlike the analog broadcasting.

In addition, recently, various researches for stereographic images are being progressed, and the stereographic image technologies are becoming more common and have been put to practical use in another various environments and technologies as well as computer graphics.

SUMMARY OF THE INVENTION

An object of the disclosure is to provide a method for displaying stereoscopic images to be appropriate for a user and an image display apparatus thereof.

To achieve the object, a method for displaying 3D images according to an embodiment of the disclosure includes producing a depth map using a left eye image and a right eye image; adjusting depth values of the produced depth map according to any one of a plurality of depth level adjustment modes; and displaying the stereoscopic images using the adjusted depth values, wherein the depth level adjustment modes include a forward 3D depth adjustment mode increasing the depth levels representing perspective of objects included in the stereoscopic images, a backward 3D depth adjustment mode reducing the depth levels and a bi-directional 3D depth adjustment mode simultaneously increasing and reducing the depth levels.

On the other hand, a method for displaying 3D images according to another embodiment of the disclosure includes receiving stereoscopic image signals; adjusting the depth level representing the perspective of the objects included in the stereoscopic images to pre-set depth level values by the user input; and displaying the stereoscopic images according to the received stereoscopic image signals using the adjusted depth level, wherein the pre-set depth level values are set to be corresponded to at least one of a forward 3D depth adjustment mode increasing the depth levels, a backward 3D depth adjustment mode reducing the depth levels and a bi-directional 3D depth adjustment mode simultaneously increasing and reducing the depth levels.

Further, an image display apparatus 3D images according to an embodiment of the disclosure a receiving unit receiving stereoscopic image signals; a control unit adjusting the depth levels representing the perspective of the objects included in the stereoscopic images according to any one selected by the user of a plurality of depth level adjustment modes; a storage unit storing the adjusted depth levels; and a display unit displaying the stereoscopic images according to the received stereoscopic image signals using the adjusted depth levels, wherein the depth level adjustment modes includes a forward 3D depth adjustment mode increasing the depth levels, a backward 3D depth adjustment mode reducing the depth levels and a bi-directional 3D depth adjustment mode simultaneously increasing and reducing the depth levels.

On the other hand, the method for displaying 3D images may be implemented by computer-readable recording medium recording programs to enable computer to execute.

DESCRIPTION OF THE PREFERRED EMBODIMENTS

Hereinafter, a method for displaying stereoscopic images and an image display apparatus thereof will be described in detail with reference to attached drawings according to an exemplary embodiment of the disclosure.

Figure 1:
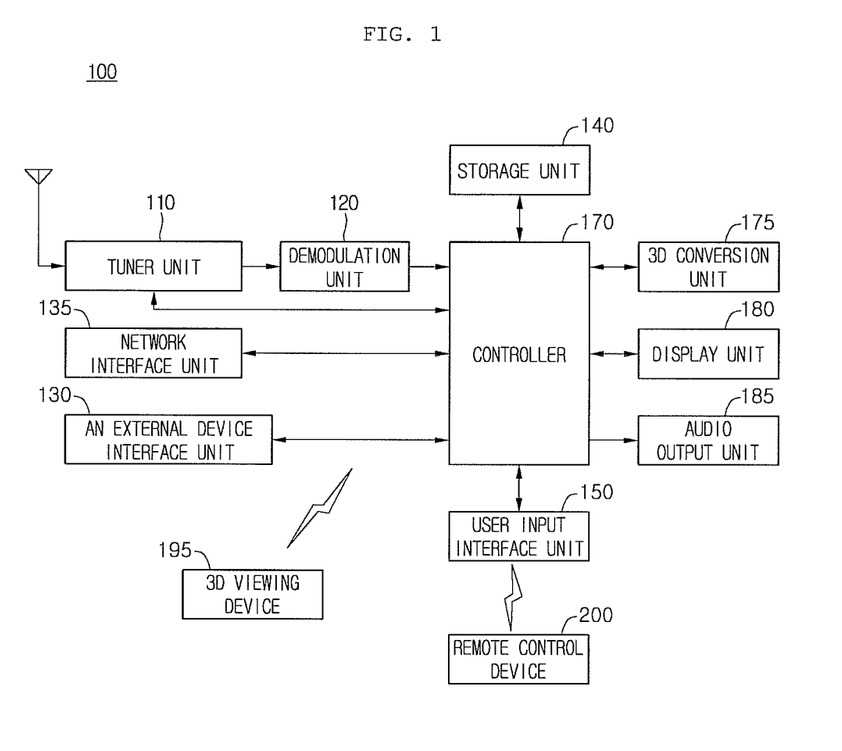
FIG. 1 is a block view showing configurations of an image display apparatus according to an exemplary embodiment of the disclosure.

FIG. 1 is a block view for configurations of the image display apparatus according to an embodiment of the disclosure, and the image display apparatus 100 shown in FIG. 1 includes a tuner unit 110, a demodulation unit 120, an external device interface unit 130, a network interface unit 135, a storage unit 140, a user input interface unit 150, a controller 170, a 3D conversion unit 175, a display unit 180, an audio output unit 185, and a 3D viewing device 195.

The tuner unit 110 selects RF (radio frequency) broadcasting signals corresponding to channels selected by a user or pre-stored all channels among RF broadcasting signals received through an antenna. Further, The tuner unit 110 converts the selected RF broadcasting signals into intermediate frequency signals, base band images or voice signals.

The demodulation unit 120 receives digital IF signals (DIF) converted by the tuner unit 110 and demodulates the digital IF signals. After performing demodulation and channel decoding, the demodulation unit 120 outputs stream signals (TS) to a controller 170.

On the other hand, the controller 170 performs demultiplex, image/voice signal processing and the like for the input stream signals TS, outputs the images to the display unit 180, and outputs the voice to the audio output unit 185.

The external device interface unit 130 may transmit or receive data to/from an external device 190 to be connected and to this end therefor, may include an A/V input and output unit (not shown) and a wireless communication unit (not shown).

On the other hand, the external device interface unit 130 may transmit or receive data to/from the 3D viewing device 195 such as 3D glasses.

The network interface unit 135 provides interface for connecting the image display apparatus 100 to wired/wireless networks including Internet network. In the network interface unit 135, Ethernet terminal and the like may be disposed to communicate with the wired network and communication specifications such as WLAN (Wireless LAN) (Wi-Fi), Wibro (Wireless broadband), Wimax (World Interoperability for Microwave Access), HSDPA (High Speed Downlink Packet Access) are used to communicate with the wireless network.

The storage unit 140 may store programs for each of signal processing and control within the controller 170, and may also store the signal processed images, voice and data signals.

The user input interface unit 150 transmits signals input by the user to the controller 170 or transmits signals output from the controller to the user For example, The user input interface unit 150 receives the user input signals such as power supply on/off, channel selection, screen settings or transmits signals from the controller 170 to a remote control device 200, according to various communication system such as RF (radio frequency) communication system, infrared (IR) communication system and the like.

The controller 170 demultiplexes the stream input through the tuner unit 110, the demodulation unit 120, or the external device interface unit 130, or processes the demultiplexed signals to produce and output the signals for the image or the voice output.

The image signals image-processed in the controller 170 are input to the display unit 180 and may be displayed as the images corresponding to the image signals. Further, the image signals image-processed in the controller 170 may be input to the exterior output device through the exterior device interface unit 130.

The voice signals processed in the controller 170 may be output to the audio output unit 185 Further, the voice signals image-processed in the controller 170 may be input to the exterior output device through the exterior device interface unit 130.

Further, the controller 170 may control the display unit 180 to display the images, and therefor, processes broadcasting images input through the tuner unit 110, exterior input images input through exterior device interface unit 130, images input through network interface unit 135 or images stored in the storage unit 140 to provide to the display unit 180.

At this time, the images displayed on the display unit 180 may be still image or moving image and two-dimensional images or stereoscopic images.

On the other hand, the display unit 180 converts image signals, data signals, OSD signals and control signals processed in the controller 170, or image signals, data signals, OSD signals and control signals received from the exterior device interface unit 130 to produce driving signals.

The display unit 180 uses PDP, LCD, OLED, flexible display and the like, and particularly, it is preferable that it is possible to use 3D display according to an embodiment of the disclosure.

For viewing the stereoscopic images, the display unit 180 is classified into an additional display type and a stand-alone display type.

The stand-alone display type may implement 3D images with the display unit 180 alone without separate additional display, for example, glasses and an example thereof is various type of lenticula type, parallax barrier and the like.

On the other hand, the additional display type may implement 3D images by using the additional display besides the display unit 180 and an example thereof is various type of head mount display (HMD) type, glasses type and the like. Further, a glasses type may be again classified into a passive type such as a polarizing glasses type and a active type such as a shutter glasses type. On the other hand, the head mount display type is also classified into the passive type and the active type.

The image display device 100 may convert 2D image signals of the broadcasting channel received through the tuner unit 110 into 3D image signals, and therefor, may dispose 3D conversion unit 175.

There is a method using a pair of left and right camera when capturing the images as the method for capturing the 3D image signals. The method may display natural stereoscopic images, but needs to use two cameras so as to capture images and has a difficulty in making the left image and the right image captured by the two cameras in a film type or an encoding type and difference and the like of frame rate between the left images and the right images.

In an another method capturing the 3D image signals, the two-dimensional image signals captured by a camera may be converted into 3D image signals.

The 3D conversion unit 175 converts two-dimensional image signals of the broadcast channel received through the tuner unit 110 into the stereoscopic image signal to enable the image of the broadcasting channel to display as the stereoscopic image through the display unit 180.

For example, the 3D conversion unit 175 performs a certain of signal processing for the two-dimensional image signal of current received broadcasting channels to produce the stereoscopic image, that is, to produce the left images and the right images and the produced stereoscopic images are processed through the controller 170 to input to the display unit 180.

The audio output unit 185 receives the signal voice-processed in the controller 170, for example, stereo signals, i.e., 3.1 channel signal or 5.1 channel signal to output as voice. The voice output 185 may be implemented with various type of a speaker.

In the embodiment of the disclosure, the controller 170 produces depth maps using left eye images and right eye images (for example, included in the stereoscopic image signal received through the turner unit 110) input from the outside, adjusts depth values composing the depth map produced above, and then, performs rendering to transmit to the display unit 180, thereby displaying 3D stereoscopic images through the display unit 180.

The depth map is map representing 3D distance differences between objects within the images and may be represented as values between 0 and 255 for each pixel. For example, when representing based on black/white, black (low value) represents a long distance from the viewers and white (high value) represents a close distance from the viewers.

As described above, since a method producing the depth map by the controller 170 uses various prior algorithms, detailed description thereof is omitted below.

Hereinafter, an embodiment for specific configurations of the controller 170 shown in FIG. 1 will be described in detail with reference to FIG. 2.

In an embodiment of the disclosure, the controller 170 includes a demultiplexing unit 210, an image processing unit 220, an audio processing unit 230, an OSD producing unit 240, a mixer 245, a frame rate conversion unit 250 and a formatter 260.

The demultiplexing unit 210 demultiplexes the stream to be input. For example, when MPEG-2 TS is input, the demultiplexing unit 210 demultiplexes MPEG-2 TS to separate into images, voice and data signals.

The image processing unit 220 performs image processing of the demultiplexed image signals and therefore, includes an image decoder 225 and a scaler 235.

On the other hand, the image decoder 225 decodes the demultiplexed image signals, and the scaler 235 scales the decoded image signals to be outputable resolution on the display unit 180.

Further, the image decoder 225 includes a 3D image decoder (not shown) decoding 3D image signals, the demultiplexed image signals input to the 3D image decoder (not shown) become the image signal encoded using MVC (Multi-view Video Coding) or dual AVC, or signals mixed with each encoded left eye image signals and right eye image signals.

Figure 2:
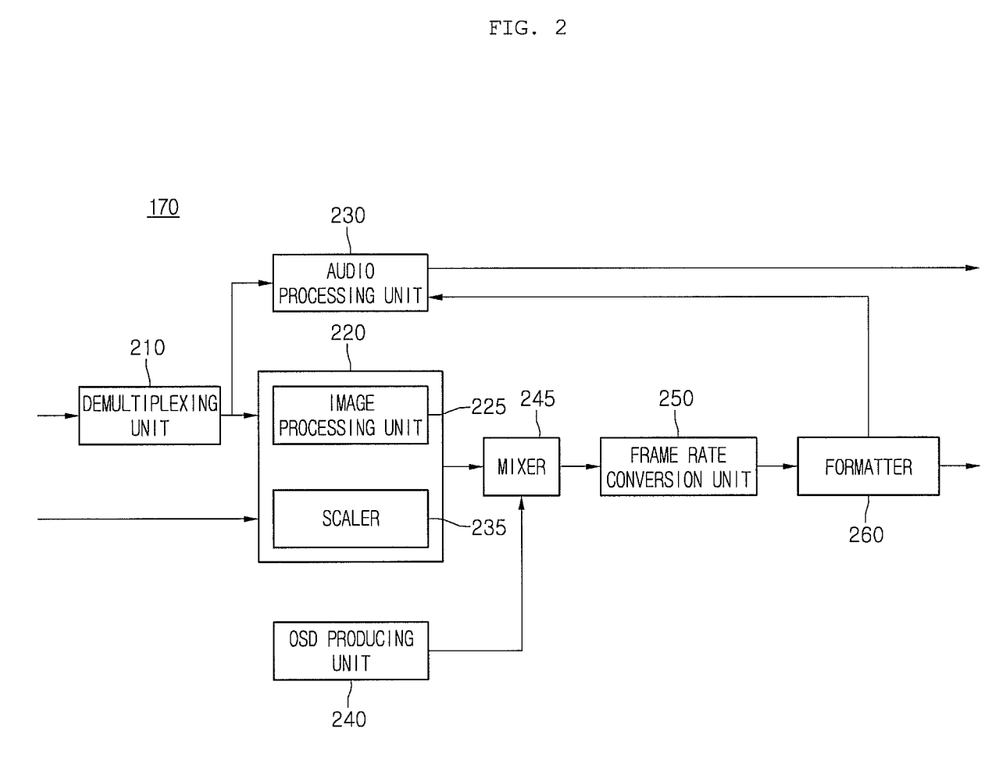
FIG. 2 is a block view showing an embodiment for configurations of a controller shown in FIG. 1.

For example, the image signals of the broadcasting channel received through the tuner unit(110) become two-dimensional image signals, stereoscopic image signals or signals mixed with the two-dimensional image signals and the stereoscopic image signals and the controller 170 having configurations as shown in FIG. 2 processes the broadcasting signals according to the type of the image signals to output to the 3D conversion unit, the display unit 180 and the audio output unit 185.

On the other hand, the audio processing unit 230 may perform voice processing of the demultiplexed voice signal.

The OSD producing unit 240 produces the OSD signals by the user input or autonomously. For example, the OSD producing unit 240 may produce signals displaying various information into a graphic or text type on the screen of the display unit based on the user input signal.

Meanwhile, the mixer 245 may mix the OSD signals produced by the OSD producing unit 240 and the image signal imaged-processed and decoded by the image processing unit 220. In this case, the OSD signals and the decoded image signals become any one of the two-dimensional image signals and the stereoscopic image signals, respectively, and the mixed image signals may be provided to the frame rate conversion unit 250.

The frame rate conversion unit (Frame Rate Converter, FRC) 250 converts frame rate of the image to be input, for example, may convert the frame rate of 60 Hz into 120 Hz or 240 Hz.

In addition, the formatter 260 may separate the signals mixed in the mixer 245 into the two-dimensional image signals and the stereoscopic image signals and may also change format of the stereoscopic image signal.

The controller 170 having configurations as shown in FIG. 2 may correct the depth value composing the depth map using the following equation 1.

$$D_0 = \alpha * D_I + \beta$$ [Equation 1]

In above equation 1, DI s the depth value composing depth map, D0 is the depth value adjusted by the controller 170, β is the depth level adjusting three-dimensional effect of the stereoscopic image, and α is volume level adjusting perspective of the stereoscopic image.

That is, the controller 170 of the image display device 100 may adjust the perspective of objects present within the stereoscopic image by changing the depth levels (β), and may adjust the three-dimensional effect of objects present within the stereoscopic image by changing the depth levels(α).

An embodiment of the disclosure, a user adjusts the depth levels to enable the stereoscopic image having the perspective customized to the user to display.

For example, when the perspective of the objects included in the stereoscopic image is not suitable for the user, the user may feel troublousness or fatigue. Therefore, the user directly adjusts the depth levels to have the perspective suitable for the user to display 3D stereoscopic images in customized environment.

Therefor, the image display device 100 provides the depth level adjustment modes including a forward 3D depth adjustment mode sequentially increasing the depth levels, a backward 3D depth adjustment mode sequentially reducing the depth levels and a bi-directional 3D depth adjustment mode simultaneously increasing and reducing the depth levels to enable the user to easily select the depth levels suitable for the user.

Further, in another embodiment of the disclosure, the user adjusts the volume levels to enable the stereoscopic image to display with appropriate three-dimensional effect. That is, when the volume levels(α) is increased, the three-dimensional effect of each object included in the stereoscopic image is increased, and when the volume levels(α) is decreased, the three-dimensional effect of each object is reduced. Therefore, the user enables the stereoscopic image having the three-dimensional effect suitable for the user to display on the image display apparatus 100.

Hereinafter, the 3D image display method in an embodiment of the disclosure will be described in more detail with reference to FIG. 3 to FIG. 15.

Figure 3:
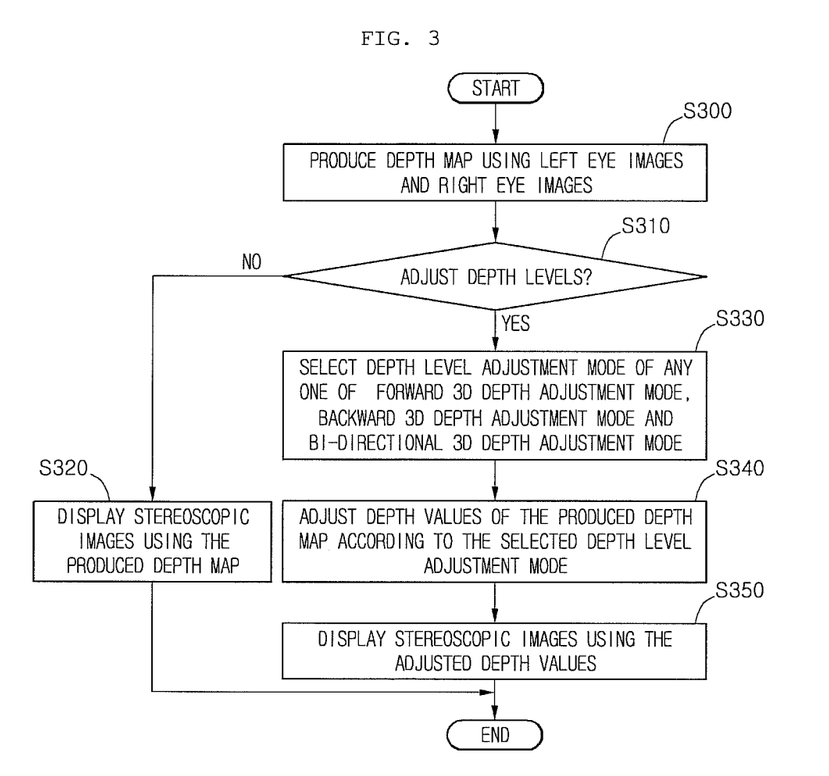
FIG. 3 a flow chart showing a method for displaying stereoscopic images according to an embodiment of the disclosure.

FIG. 3 is a flow chart showing a method for displaying 3D images according to an embodiment of the disclosure and describes the method for displaying 3D images in relation to configurations of the image display apparatus 100 according to an embodiment of the disclosure shown in FIG. 1.

In FIG. 3, the controller 170 of the image display apparatus 100 produces the depth map using the left eye images and the right eye images(S300).

For example, the broadcasting signals received through the tuner 110 may become the stereoscopic image signals including the left eye images and the right eye images, and the controller 170 may produce the depth map using the left eye images and the right eye images included in the received broadcasting signal.

In addition, the left eye images and the right eye images may become the 3D image signals converted from the two-dimensional image signals received through the turner unit 110 in the 3D conversion unit 175 of the image display apparatus 100.

Then, the user interface unit 150 of the image display apparatus 100 selects whether the depth levels are adjusted to display the stereoscopic image by selection of the user(S310). When the depth levels are not adjusted, the display unit 180 displays the stereoscopic images using the depth values according to the produced depth map(S320).

Meanwhile, when the user desires to adjust the depth levels, the user interface unit 150 selects the depth level adjustment mode of any one of the forward 3D depth adjustment mode, the backward 3D depth adjustment mode and the bi-directional 3D depth adjustment mode by selection of the user(S330).

Then, the controller 170 of the image display apparatus 100 adjusts the depth values of the produced depth map according to the selected depth level adjustment mode(S340), and the display unit 180 displays the stereoscopic images using the adjusted depth values(S350).

Hereinafter, the depth level adjustment modes will be described in detail with reference to FIG. 4 to FIG. 7.

Figure 4:
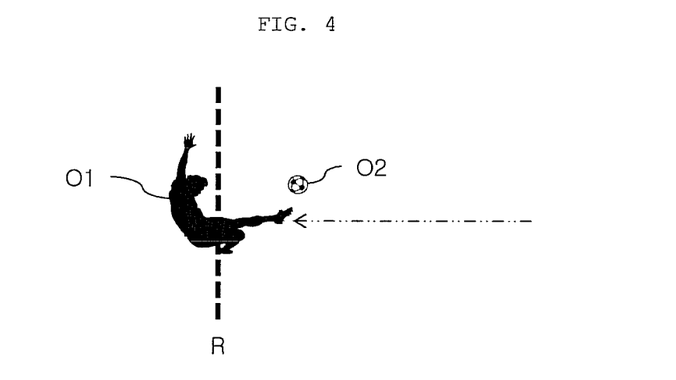
FIGS. 4, 5A to 5C, 6A to 6C, and 7A to 7C describe an embodiment for a number of depth level adjustment modes.

In FIG. 4, objects(O1, O2) included in the stereoscopic image are displayed to a specific baseline R to be displayed to have perspective as being at position away from the user by certain distance.

For example, the baseline R may be basically set to be corresponded to position at which the image display apparatus 100 is disposed.

Figure 5:
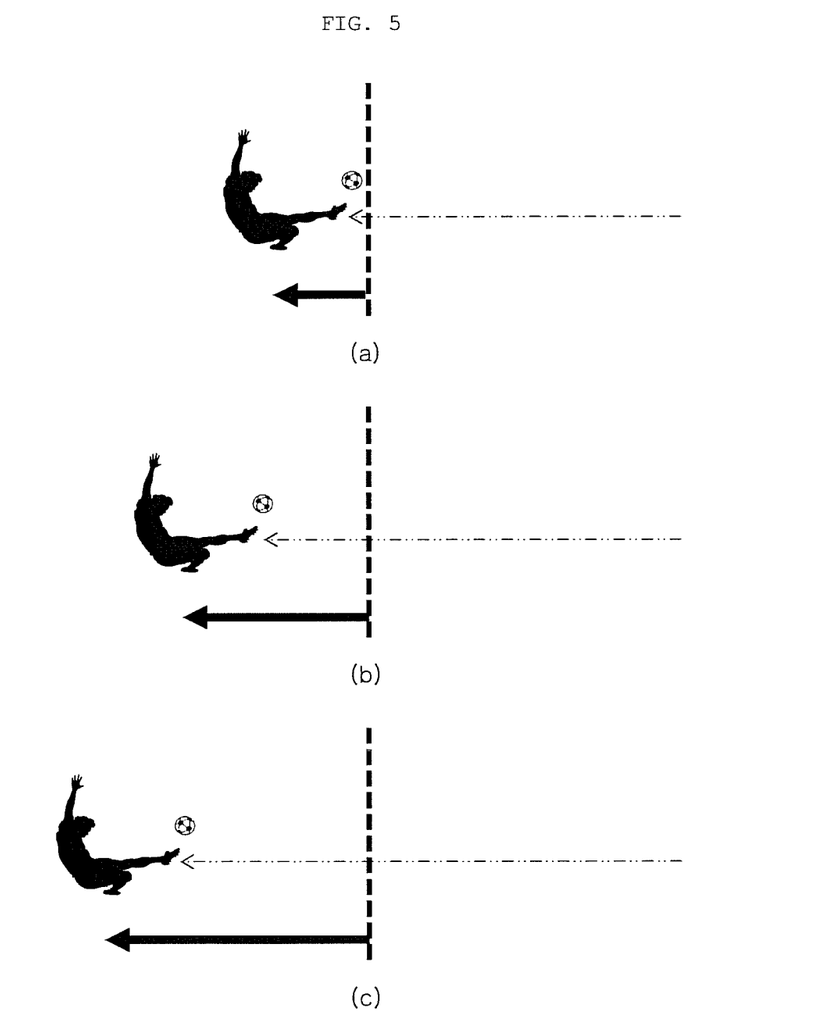

Referring to FIG. 5, in the backward 3D depth adjustment mode, as the depth levels sequentially reduce, objects(O1, O2) included in the stereoscopic image sequentially increase distance from the user to adjust the perspective in the direction entering the inside of the image display apparatus 100.

As shown in FIG. 5A to 5C, the user checks the stereographic image that the objects(O1, O2) enter the inside of the image display apparatus 100 and then, selects time to minimum troublousness and fatigue. Then, the stereoscopic image having perspective customized to the user may be displayed by adjusting the depth levels to the corresponding value.

Figure 6:
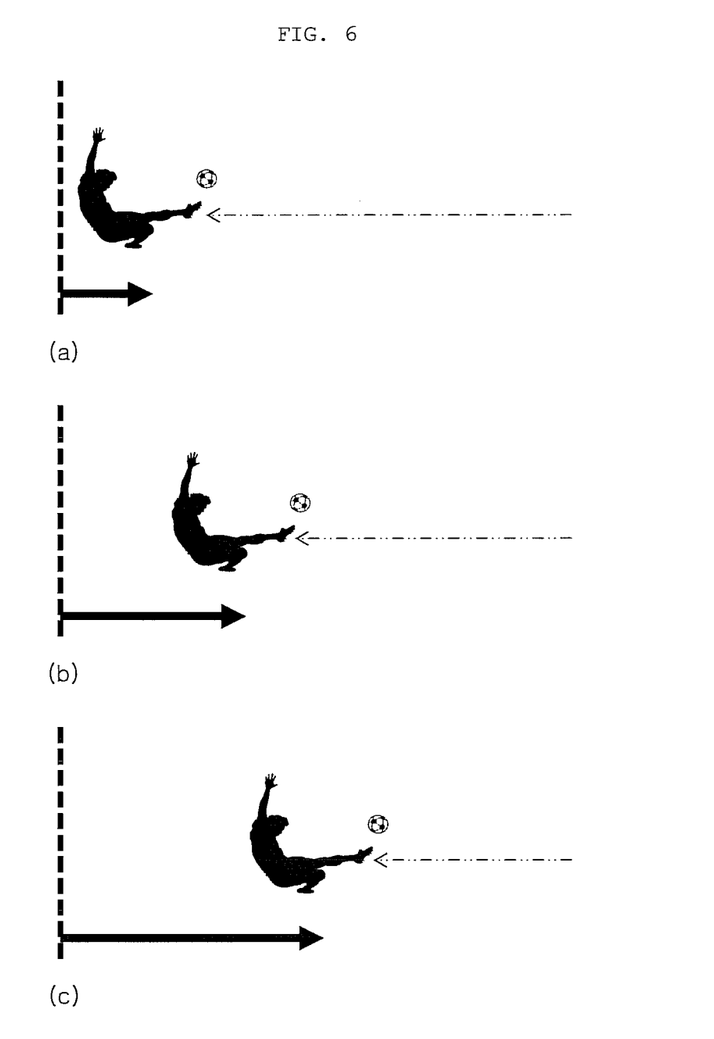

Referring to FIG. 6, in the forward 3D depth adjustment mode, as the depth levels sequentially increase, objects(O1, O2) included in the stereoscopic image sequentially decrease distance from the user to adjust the perspective in the direction exiting the outside of the image display apparatus 100.

As shown in FIG. 6A to 6C, the user checks the stereographic image that the objects(O1, O2) exit the outside of the image display apparatus 100 and then, selects time to minimum troublousness and fatigue. Then, the stereoscopic image having perspective customized to the user may be displayed by adjusting the depth levels to the value.

Figure 7:
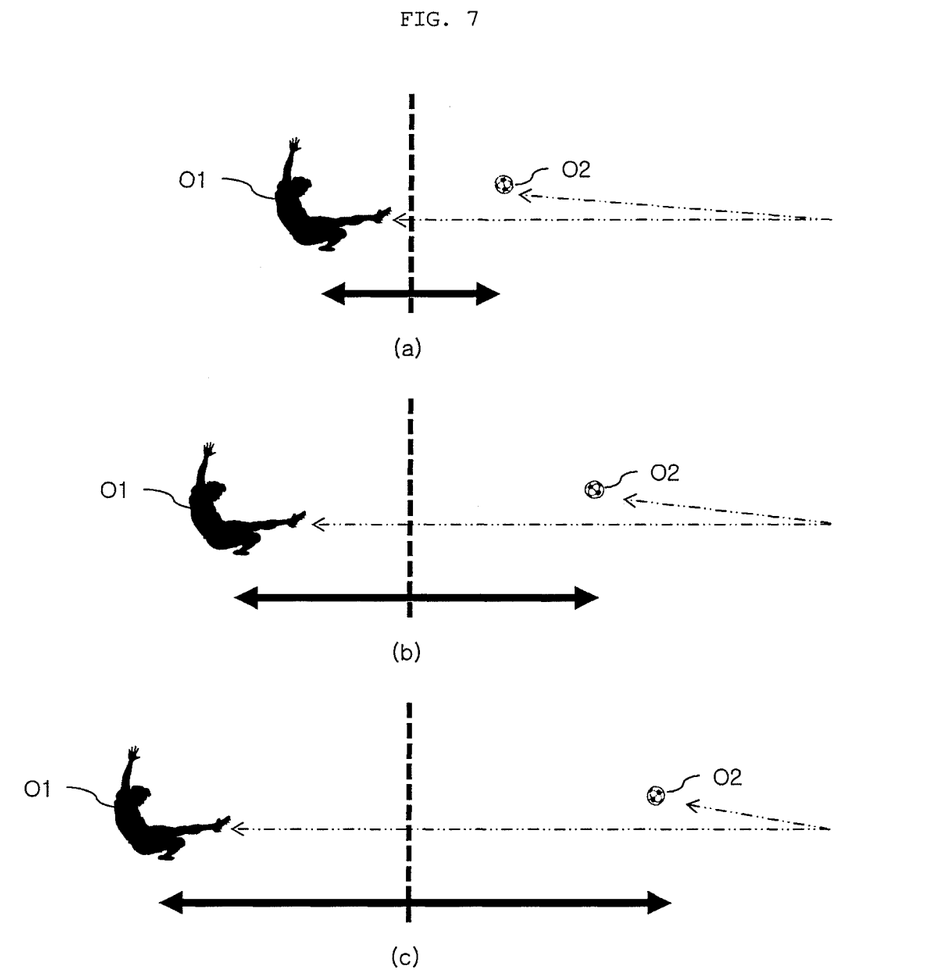

In FIG. 7, in the bi-directional 3D depth adjustment mode, the depth levels for the portion of the objects included in the stereoscopic images sequentially reduce, and at the same time, the depth levels of another objects sequentially may increase.

For example, the depth levels for a first object(O1) are sequentially decreased and therefore, the perspective of the corresponding object is adjusted in the direction entering the inside of the image display device 100. At the same time, the depth levels for a second object(O2) are sequentially increased and therefore, the perspective of the object is adjusted in the direction exiting the outside of the image display device 100.

As shown in FIG. 7A to 7C, the user checks the stereographic image that the objects(O1, O2) simultaneously enter and exit the inside and outside of the image display apparatus 100 and then, selects time to minimum troublousness and fatigue. Then, the stereoscopic image having perspective customized to the user may be displayed by adjusting the depth levels to the corresponding value.

The user may easily select the depth levels suitable for the user by variously providing the adjustment mode adjusting the depth levels as above, that is, the forward 3D depth adjustment mode, the backward 3D depth adjustment mode and the bi-directional 3D depth adjustment mode.

Figure 8:
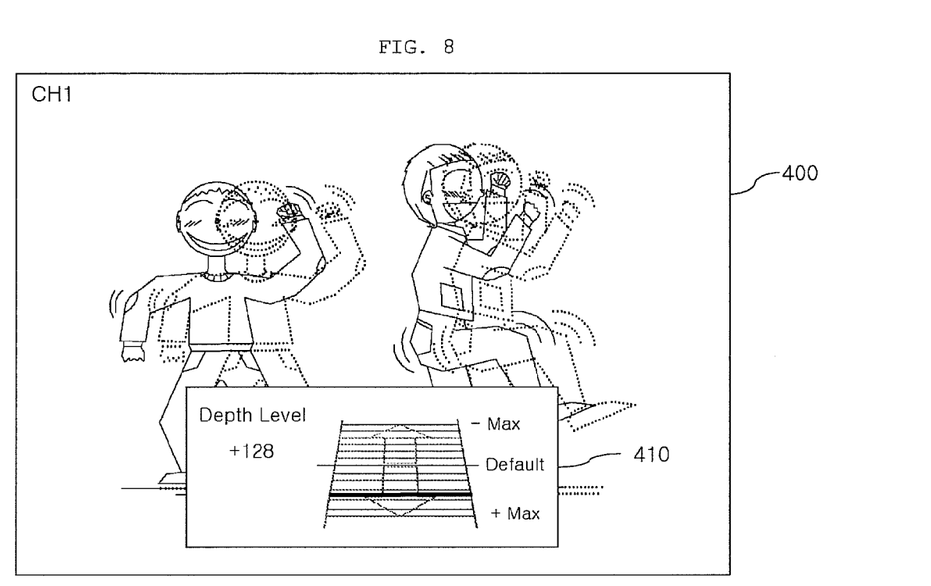
FIG. 8 shows an embodiment of the method for displaying depth levels adjusted by user inputs on the screen.

FIG. 8 shows an embodiment of the method for displaying depth levels adjusted by user inputs on the screen.

In FIG. 8, information for the depth levels adjusted as above may be provided to the user using the user interface displayed on the screen 400.

For example, when the depth levels are adjusted according to the depth level adjustment mode of any one of the forward 3D depth adjustment mode, the backward 3D depth adjustment mode and the bi-directional 3D depth adjustment mode, a pop-up window 410 representing current value of the adjusted depth levels may be displayed on the screen 400.

Thereabout, the user checks the stereoscopic image according to the depth level value to be adjusted through the screen 400 and simultaneously, checks the currently adjusted value to more accurately and easily adjust the depth levels.

As described with reference to FIG. 3 to FIG. 8, the depth level adjustment method may be performed according to a request of the user when the user determines that the stereoscopic images are inappropriate by first checking the stereoscopic images displayed according to the depth levels set to be a default value, when the user powers-on a power supply of the image display apparatus 100 and then, the 3D image signals are input from the outside or a "2D-to-3D conversion" function is requested.

Further, in the method described with reference to FIG. 3 to FIG. 8, the adjusted depth levels are set differently from each other by the user, channels, programs, genre or the user condition (for example, the user's current feeling according to the user' biorhythm) to store in the storage unit 140 of the image display apparatus 100.

Then, in the adjusting of the depth levels, the depth levels are automatically changed as values stored in the storage unit 140 corresponding to the user, channels, programs, genre or the user condition or are manually changed as the stored values by the request of the user.

In another embodiment of the disclosure, when pre-set events such as change of stereoscopic image source, format change from two-dimensional images to stereoscopic images, channel change and program change occur, the adjusted depth levels are changed as the default value or may be readjust according to the request of the user.

Figure 9:
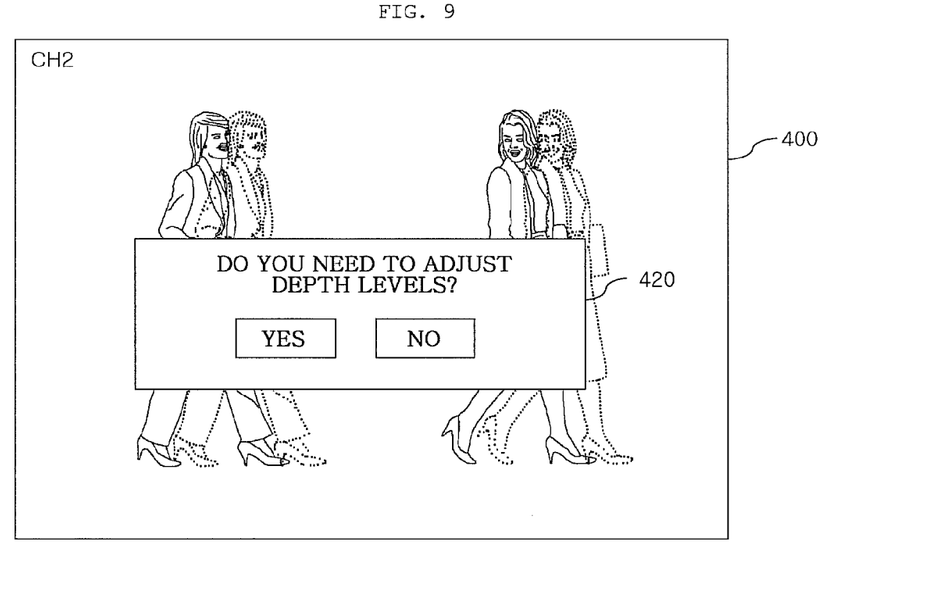
FIGS. 9 and 10 show an embodiment for the method for selecting depth level adjustment modes.

In FIG. 9, when the user adjusts and views broadcasting channel "CH1" providing 3D images as the depth levels to be appropriated for the user according to the method, if the broadcasting channel "CH1" is channel-switched to another broadcasting channel "CH2" providing 3D images, the depth levels may be changed into default depth levels.

After that, the depth levels are changed into user customized optimal depth levels adjusted for previous channel "CH1", and the stereoscopic images of the "CH2" may be displayed using the previous adjusted depth levels.

Further, as shown in FIG. 9, when channel-switching, the pop-up window 420 may be displayed on the screen to check whether the depth levels are adjusted.

Figure 10:
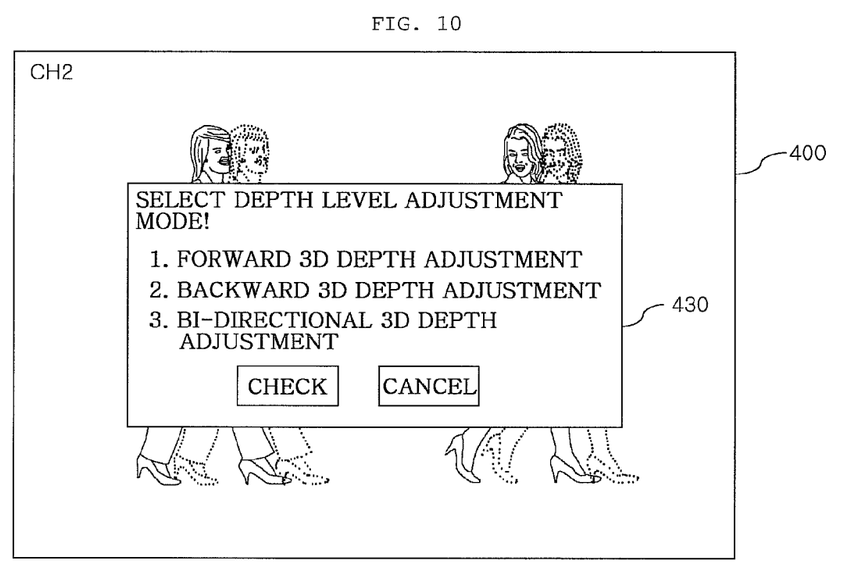

On the other hand, in the pop-up window 420 shown in FIG. 9, when the user selects "YES" button, as shown in FIG. 10, user-selectable depth level adjustment modes, that is, the forward 3D depth adjustment mode, the backward 3D depth adjustment mode and the bi-directional 3D depth adjustment mode may be provided through the pop-up window 430.

Thereabout, the user selects any one of the adjustment modes to readjust the depth levels to be applied to the stereoscopic image of the "CH2" according to the corresponding adjustment mode using the same method as those described with reference to FIG. 3 to FIG. 8.

In another embodiment of the disclosure, the depth levels may be adjusted to the pre-set depth level value by the user input.

As described above, the values, to which the depth levels are adjusted, are pre-set by the user and may be stored in the storage unit 140. The pre-set depth level values may be followed by at least one of the forward 3D depth adjustment mode, the backward 3D depth adjustment mode and the bi-directional 3D depth adjustment mode.

In more detail, the depth level, values may be pre-set for the forward 3D adjustment depth mode, the backward 3D depth adjustment mode and the bi-directional 3D depth adjustment mode, respectively, the depth level values set for the forward 3D depth adjustment mode are value to allow the depth levels to be increased from the default value, the depth level values set for the backward 3D depth adjustment mode are value to allow the depth levels to be decreased from the default value, and the depth level values set for the bi-directional 3D depth adjustment mode may include value to allow the depth levels to be increased from the default value for a object and value to allow the depth levels to be decreased from the default value for another object.

The depth level values set to be corresponded to each adjustment modes as above may be the depth level values adjusted previously according to the corresponding adjustment modes and stored in the storage unit 140 or values designated and set by the user to be corresponded to the corresponding adjustment modes.

For example, in the pop-up window 430 as shown in FIG. 9, if the user selects desired one of the forward 3D depth adjustment mode, the backward 3D depth adjustment mode and the bi-directional 3D depth adjustment mode, the depth levels may be adjusted to the depth level values set to be corresponded to the selected adjustment modes.

On the other hand, at least two of the depth level values may be set for any one of the adjustment modes, at least two of the depth level values set for one adjustment mode may be the values may be the values designated by the user, channels, programs, genre or the user condition (for example, the user's current feeling according to the user' biorhythm).

Hereinafter, in FIG. 11 to FIG. 13, an embodiment of the method adjusting the depth levels to the pre-set depth levels by the user input will be described in detail.

Figure 11:
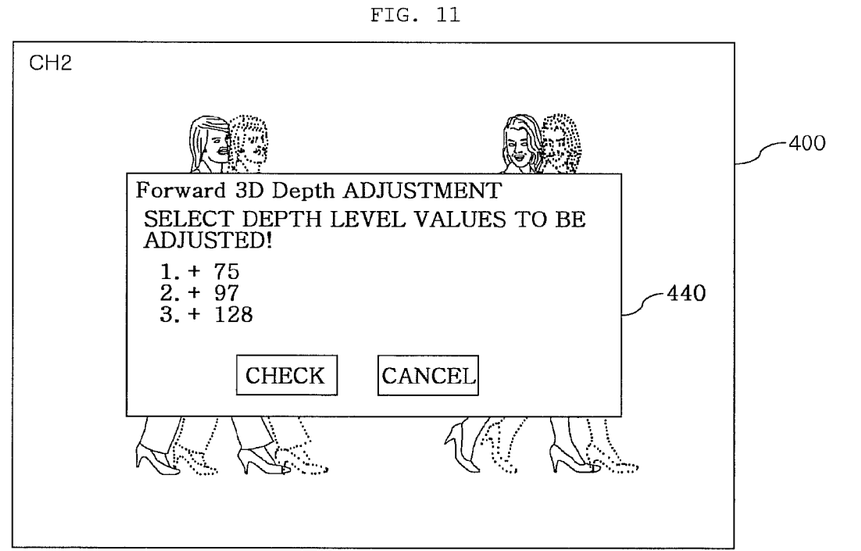
FIGS. 11 to 13 show an embodiment for the method for adjusting depth levels by user inputs.

In FIG. 11, when the user selects the forward 3D depth adjustment mode of the forward 3D depth adjustment mode, the backward 3D depth adjustment mode and the bi-directional 3D depth adjustment mode, information for the depth level value set to correspond to the selected forward 3D depth adjustment mode may be displayed on the pop-up window 440.

For example, the depth level values, i.e., "+75", "+97" and "+128" set for the forward 3D depth mode selected by the user are displayed on the pop-up window 440, and therefore, the user selects any one of the three depth level values pre-set for the forward 3D depth mode to adjust the depth levels.

Further, when the pre-set depth level values are set differently from each other according to the user, channels, genre or the user condition, the differently set depth level values check current condition of the image display apparatus 100, for example, current user, current viewing channel, current viewing program, viewing program genre or current user condition and the like to adjust the depth levels to the depth level value (that is, set to correspond to the current condition) suitable for them.

Figure 12:
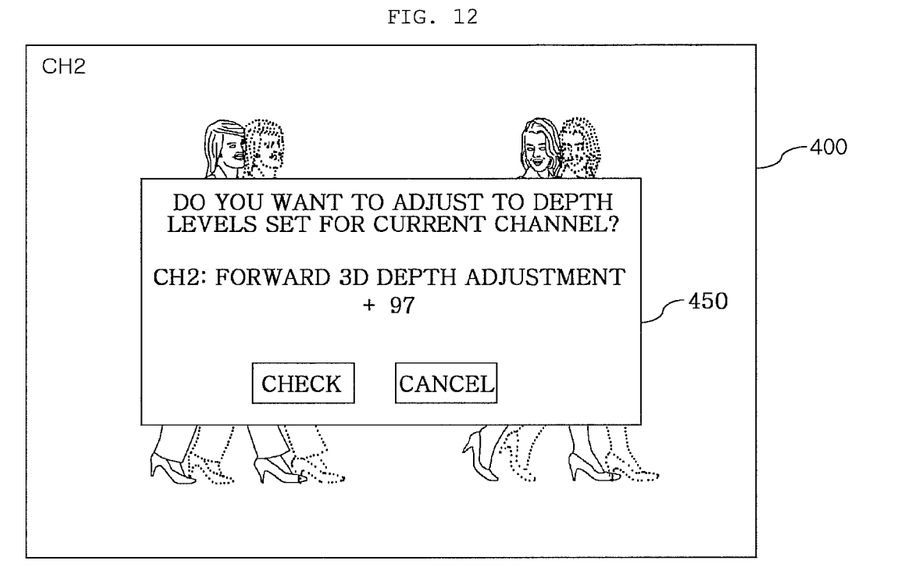

In FIG. 12, when the viewing channel is switched to "CH2", the pop-up window 450 may be displayed on the screen 400 to select whether the depth levels are adjusted to the depth level value set for the "CH2" by selection of the user.

In this case, when the user selects "check" button of the pop-up window 450, the depth levels may be adjusted to "+97" (forward 3D depth adjustment mode) set for current viewing channel "CH2".

Figure 13:
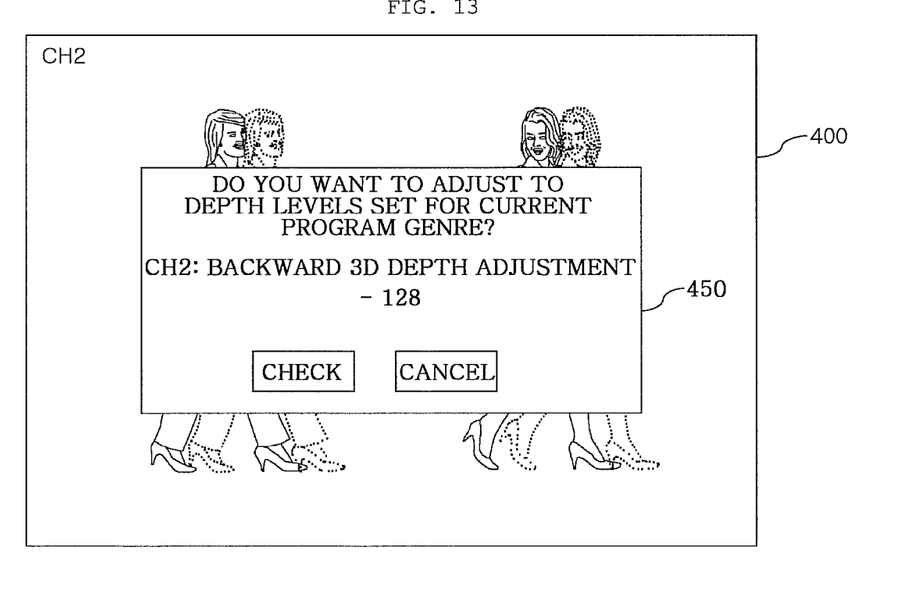

In FIG. 13, when genre of the viewing program is "movie", the pop-up window 450 may be displayed on the screen 400 to select whether the depth levels are adjusted to the depth level value set for the "movie" genre.

In this case, when the user selects "check" button of the pop-up window 450, the depth levels may be adjusted to "−128" (backward 3D depth adjustment mode) set for genre of current viewing program, that is, "movie".

Figure 14:
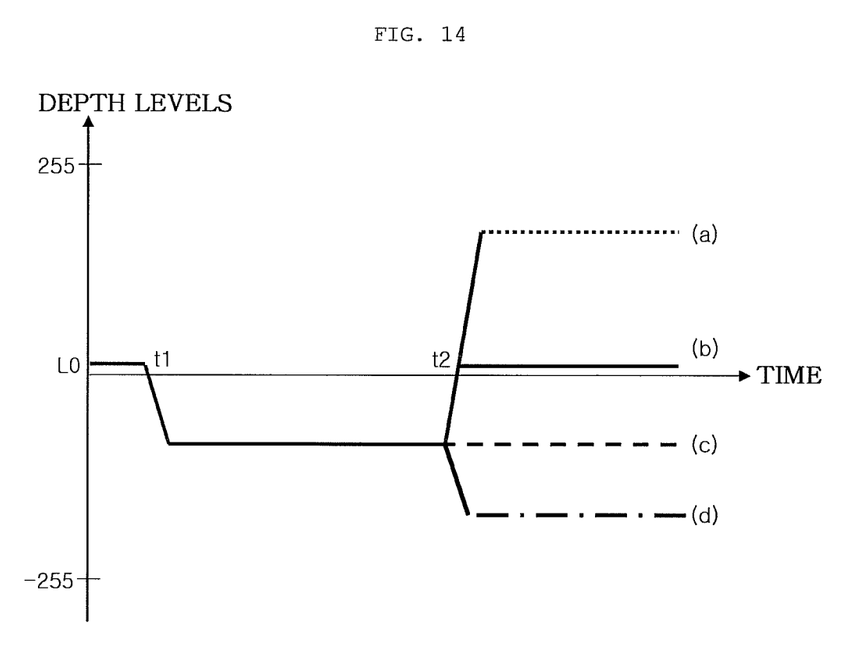
FIG. 14 is a graph showing an embodiment for change of depth levels.

FIG. 14 shows graph of an embodiment for change of the depth levels, and describes an example for process changing the depth levels by generating event such as channel change as above.

In FIG. 14, when the image display apparatus 100 powers-on, the depth levels may be set to be default value. The default value of the depth levels may be the value set in the manufacturing process of the image display apparatus 100 or the adjustment value adjusted and stored by the user when previously using the image display apparatus 100.

Then, at specific time t1, for example, at time receiving the 3D image signal and requesting "2D-to-3D" conversion, the depth levels may be adjusted by the user according to the method described with reference to FIG. 3 to FIG. 8, and the adjusted depth levels may be values between −255 and +255.

On the other hand, when the event such as change of the stereoscopic image source, format change from the two-dimensional image to the stereoscopic image, channel change and program change at the specific time t2 is generated, according to selection of the user, the depth levels are increased (in the case of (a)) or is changed to the default value (in the case of (b)), is maintained as the existing adjusted value (in the case of (c)), or may be readjusted to be reduced (in the case of (d)).

In another embodiment of the disclosure, the depth levels are adjusted by the method described with reference to FIG. 3 to FIG. 14 and then, the process changing the volume levels may be further provided to adjust the three-dimensional effect of the object included in the stereoscopic image.

Figure 15:
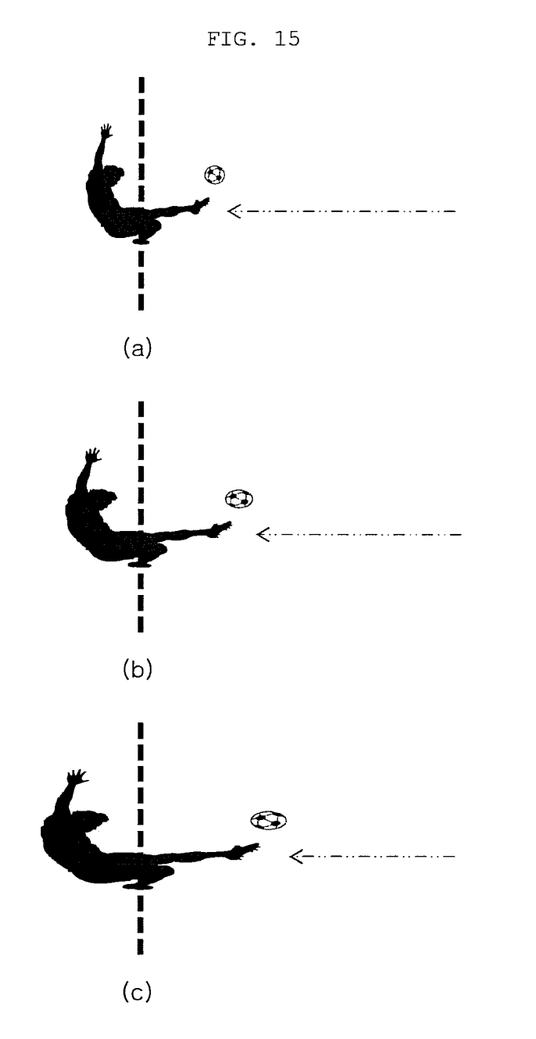
FIGS. 15A to 15C describe an embodiment for the method for adjusting volume levels.

In FIG. 15, as the volume levels are increased, as described above with reference to equation 1, the three-dimensional effect of the objects included in the stereoscopic image is increased to display.

The user adjusts the depth levels of the stereoscopic image to provide the perspective customized to the user, and additionally adjusts the volume levels, thereby viewing the stereoscopic image in a comfortable environment.

In an embodiment of the disclosure, the depth levels displaying the stereoscopic images may adjust using various adjustment modes such as the forward 3D depth mode, the backward 3D depth adjustment mode and the bi-directional 3D depth adjustment mode, thereby providing the stereoscopic image to the user in a customized environment.

The stereoscopic image display method according to above-described disclosure is manufactured with program performing in computer and is stored to the computer-readable recording medium. An example of the computer-readable recording medium is ROM, RAM, CD-ROM, magnetic tape, floppy disk, optical data storage device and the like, and may be also implemented in a type of carrier waves (for example, transmittance through Internet)

The computer-readable recording medium is distributed to the computer system connected to network, and the computer-readable code is stored in a distributed way and may be performed. Further, functional program, code, code segments implementing the method may be easily inferenced by programmer in the art to which the disclosure belongs.

In addition, although the preferred embodiments of the disclosure are shown and described above, the disclosure is not limited to above-described specific embodiment and is variously modified by one skilled in the art without the gist of the disclosure claimed in the claim, such that the modified embodiment is not to be understood separately from technical ideas or views of the disclosure.

What is claimed is:

1. A method for displaying stereoscopic images, comprising:
   producing, by a controller, the stereoscopic image having a depth map with a first depth level value based on a left eye image and a right eye image, the stereoscopic image including at least first and second objects;
   adjusting, by the controller, the first depth level value of the produced depth map by adjusting a depth level in any one of a plurality of depth level adjustment modes; and
   displaying, by a display, the stereoscopic image having the adjusted first depth level value on a screen,
   wherein the plurality of depth level adjustment modes include a forward 3D depth adjustment mode, a backward 3D depth adjustment mode and a bi-directional 3D depth adjustment mode,
   wherein in the forward 3D depth adjustment mode, both the first and second objects included in the stereoscopic image increase from the first depth level value to a second depth level value such that both the first and second objects have a perspective in a direction that exits the outside of the screen,
   wherein in the backward 3D depth adjustment mode, both the first and second objects included in the stereoscopic image decreases from the first depth level value to a third depth level value such that both the first and second objects have a perspective in a direction that enters the inside of the screen, and
   wherein in the bi-directional 3D depth adjustment mode, the first object included in the stereoscopic image increase from the first depth level value to a fourth depth level value such that the first object has a perspective in a direction that exits the outside of the screen and, at the same time, the second object included in the stereoscopic image decreases from the first depth level value to a fifth depth level value such that the second objects has a perspective in a direction that enters the inside of the screen.

2. The method for displaying stereoscopic images according to claim 1, wherein the adjusting includes
   displaying the stereoscopic image to be corresponded to change of the first depth level valve to be sequentially increased or decreased; and
   selecting any one value of the changed first depth level value from a user.

3. The method for displaying stereoscopic images according to claim 1, further comprising displaying information for the increased or decreased first depth level value on the screen.

4. The method for displaying stereoscopic images according to claim 1, wherein the adjusting includes:
   changing a default depth level value to another depth level value, when pre-set event of any one of change of stereoscopic image source, format change from two-dimensional images to stereoscopic images, channel change and program change occur.

5. The method for displaying stereoscopic images according to claim 1, wherein the adjusting adjusts the first depth level value using the mode set by the user among the plurality of depth level adjustment modes.

6. The method for displaying stereoscopic images according to claim 1, further comprising setting and storing the adjusted first depth level value differently from each other according to any one of the user, channels, programs, genre or the user condition.

7. The method for displaying stereoscopic images according to claim 1, wherein the adjusting includes adjusting volume levels representing three-dimensional effect of the objects included in the stereoscopic image.

8. A method for displaying stereoscopic images, comprising:
   receiving, by a receiver, the stereoscopic image having a first depth level value and produced based on a left eye image and a right eye image, the stereoscopic image including at least first and second objects;
   adjusting, by a controller, the depth levels based on the first depth level value to pre-set depth level values by the user input; and
   displaying, by a display, the stereoscopic image having the adjusted depth level value on a screen,
   wherein the pre-set depth level values are set to be corresponded to at least one of a forward 3D depth adjustment mode, a backward 3D depth adjustment mode and a bi-directional 3D depth adjustment mode,
   wherein in the forward 3D depth adjustment mode, both the first and second objects included in the stereoscopic image increase from the first depth level value to a second depth level value such that both the first and second objects have a perspective in a direction that exits the outside of the screen,
   wherein in the backward 3D depth adjustment mode, both the first and second objects included in the stereoscopic image decreases from the first depth level value to a third depth level value such that both the first and second objects have a perspective in a direction that enters the inside of the screen, and
   wherein in the bi-directional 3D depth adjustment mode, the first object included in the stereoscopic image increase from the first depth level value to a fourth depth level value such that the first object has a perspective in a direction that exits the outside of the screen and, at the same time, the second object included in the stereoscopic image decreases from the first depth level value to a fifth depth level value such that the second objects has a perspective in a direction that enters the inside of the screen.

9. The method for displaying stereoscopic images according to claim 8, wherein the adjusting includes
   selecting any one of a plurality of pre-set depth level values by selection of the user, and
   adjusting the first depth level value to the selected depth level values.

10. The method for displaying stereoscopic images according to claim 8, wherein the adjusting includes
    selecting any one of the forward 3D depth adjustment mode, the backward 3D depth adjustment mode and the bi-directional 3D depth adjustment mode by selection of the user; and
    adjusting the depth levels to the depth level values corresponding to the selected adjustment mode.

11. The method for displaying stereoscopic images according to claim 8, wherein the pre-set depth level values are set as at least two values for any one of the forward 3D depth adjustment mode, the backward 3D depth adjustment mode and the bi-directional 3D depth adjustment mode.

12. The method for displaying stereoscopic images according to claim 8, wherein the pre-set depth level values are set differently from each other according to at least one of the user, channels, programs, genre or the user condition.

13. The method for displaying stereoscopic images according to claim 12, further comprising
checking at least one of the user, channels, programs, genre or the user condition; and
determining any one of the pre-set depth level values as adjustment values according to the checked result.

14. An image display apparatus, comprising:
a receiver that receives the stereoscopic image having a first depth level value and produced based on a left eye image and a right eye image, the stereoscopic image including at least first and second objects;
a controller that produces a depth map having a first depth level value based on the left eye image and the right eye image, adjusts the first depth level value representing a perspective of the first and second objects included in the stereoscopic images according to any one selected by the user of a plurality of depth level adjustment modes;
a storage device that stores the adjusted first depth level value; and
a display that displays the stereoscopic images having the adjusted first depth level value on a screen,
wherein the plurality of depth level adjustment modes includes a forward 3D depth adjustment mode, a backward 3D depth adjustment mode and a bi-directional 3D depth adjustment mode,
wherein in the forward 3D depth adjustment mode, both the first and second objects increase from the first depth level value to a second depth level value such that both the first and second objects have a perspective in a direction that exits the outside of the screen,
wherein in the backward 3D depth adjustment mode both the first and second objects decreases from the first depth level value to a third depth level value such that both the first and second objects have a perspective in a direction that enters the inside of the screen, and
wherein in the bi-directional 3D depth adjustment mode, the first object increase from the first depth level value to a fourth depth level value such that the first object has a perspective in a direction that exits the outside of the screen and, at the same time, the second object decreases from the first depth level value to a fifth depth level value such that the second objects has a perspective in a direction that enters the inside of the screen.

15. The image display apparatus according to claim 14, wherein the display displays the stereoscopic images to be corresponded to change of the first depth level value to be sequentially increased or decreased, and
the image display apparatus further comprising a user interface device to select any one value of the changed first depth level value by selection of the user.

16. The image display apparatus according to claim 14, wherein the display displays information for the first depth level value to be increased or decreased.

17. The image display apparatus according to claim 14, wherein the controller adjusts volume levels representing three-dimensional effect of the objects included in the stereoscopic image.

* * * * *